(12) United States Patent
Park et al.

(10) Patent No.: US 11,987,174 B2
(45) Date of Patent: May 21, 2024

(54) LIGHTING DEVICE

(71) Applicant: SL Corporation, Daegu (KR)

(72) Inventors: Hye Jin Park, Gyeongsan-si (KR); Jong Min Lee, Gyeongsan-si (KR); Ki Hae Shin, Gyeongsan-si (KR); Jong Woon Kim, Gyeongsan-si (KR); Min Gi Jung, Gyeongsan-si (KR)

(73) Assignee: SL Corporation, Daegu (KR)

( * ) Notice: Subject to any disclaimer, the term of this patent is extended or adjusted under 35 U.S.C. 154(b) by 159 days.

(21) Appl. No.: 17/750,550

(22) Filed: May 23, 2022

(65) Prior Publication Data

US 2022/0402424 A1 Dec. 22, 2022

(30) Foreign Application Priority Data

Jun. 18, 2021 (KR) .......................... 10-2021-0079159

(51) Int. Cl.
*B60Q 1/24* (2006.01)
*B60Q 1/26* (2006.01)

(52) U.S. Cl.
CPC ........... *B60Q 1/247* (2022.05); *B60Q 1/2665* (2013.01)

(58) Field of Classification Search
CPC .............................. B60Q 1/247; B60Q 1/2665
USPC .................................. 362/487, 509, 512, 514
See application file for complete search history.

(56) References Cited

U.S. PATENT DOCUMENTS

| | | |
|---|---|---|
| 7,618,169 B1 | 11/2009 | Lee |
| 10,386,043 B1 | 8/2019 | Lim et al. |
| 2008/0174893 A1 | 7/2008 | Liesener et al. |
| 2014/0177252 A1* | 6/2014 | Lai .......................... B60Q 1/085 362/514 |
| 2017/0371235 A1 | 12/2017 | Yokoyama et al. |
| 2019/0163196 A1 | 5/2019 | Janssen et al. |
| 2021/0046864 A1* | 2/2021 | Elgrably ................ B60Q 1/324 |

FOREIGN PATENT DOCUMENTS

| | | |
|---|---|---|
| DE | 102018203875 A1 * | 9/2019 |
| DE | 10 2018 132 391 A1 | 6/2020 |
| DE | 10 2018 132 392 A1 | 6/2020 |

OTHER PUBLICATIONS

European Search Report in counterpart application No. EP 22171539.4 dated Oct. 28, 2022.

* cited by examiner

*Primary Examiner* — Laura K Tso
(74) *Attorney, Agent, or Firm* — United One Law Group LLC; Kongsik Kim; Jhongwoo Peck

(57) ABSTRACT

A lighting device irradiating light to different locations includes a light irradiation unit that generates light; an optical path adjustment unit that adjusts a path of the light radiated from the light irradiation unit to allow a road surface pattern to be formed at a predetermined location on a road surface around a vehicle; and a driving unit that adjusts the optical path adjustment unit to allow the road surface pattern to be formed at different locations on the road surface around the vehicle.

17 Claims, 22 Drawing Sheets

LIGHTING DEVICE

CROSS-REFERENCE TO RELATED APPLICATION

This application claims priority from Korean Patent Application No. 10-2021-0079159 filed on Jun. 18, 2021, which application is incorporated herein by reference in its entirety.

BACKGROUND

1. Technical Field

The present disclosure relates to a lighting device, and more particularly, to a lighting device that radiates light to different locations with a simplified configuration.

2. Description of the Related Art

Lighting devices are being applied to various fields such as backlights of flat panel displays, indoor lamps, and various lamps installed in vehicles.

Lighting devices installed in vehicles are used for the purpose of illumination functions, such as headlamps and fog lamps, or for the purpose of signaling functions, such as turn signal lamps, tail lamps, and brake lamps. Installation standards and specifications of the lamps are regulated by laws and regulations to ensure that functions of the lamps can be fully exhibited.

Since information that can be transmitted only with the illumination functions or signaling functions is limited, research has been actively conducted in recent years to convey more diverse information to drivers or nearby vehicles by forming a road surface pattern with relevant information around the vehicle.

Formation locations of the road surface pattern on the road surface around the vehicle need to be varied depending on the information to be transmitted, and when lamps for forming the road patterns are separately provided for different locations, the number of components increases and an installation space increases. Thus, there is a need for a method that enables various locations around a vehicle to be irradiated with light for forming a road pattern, while simplifying a configuration, to reduce the installation space.

SUMMARY

Aspects of the present disclosure provide a lighting device that enables sharing of a configuration that allows light to be radiated to different locations on a road surface around a vehicle. Aspects of the present disclosure also provide a lighting device that prevents interference by a vehicle body when a road surface pattern is formed. The aspects of the present disclosure are not limited to the aspects described above, and those skilled in the art will clearly understand other aspects from the following description.

According to an aspect of the present disclosure, a lighting device may include a light irradiation unit that generates light; an optical path adjustment unit that adjusts a path of the light radiated from the light irradiation unit to allow a road surface pattern to be formed at a predetermined location on a road surface around a vehicle; and a driving unit that adjusts the optical path adjustment unit to allow the road surface pattern to be formed at different locations on the road surface around the vehicle.

The light irradiation unit may include a light source unit that generates the light; and a light transmission unit that transmits the light generated by the light source unit to the optical path adjustment unit.

The light source unit may include a plurality of light sources, and the light irradiation unit may further include a light combining unit that combines the light generated by the plurality of light sources to allow the combined light to travel to the light transmission unit. The light transmission unit may include a plurality of lenses that adjusts concentration of the light generated by the light source unit. The light that enters the light transmission unit and the light that is output from the light transmission unit may have different directions. Accordingly, the light transmission unit may further include a mirror unit that reflects the light that passes through one of the plurality of lenses to another of the plurality of lenses.

The road surface pattern may be formed at locations having different distances from a lateral side of the vehicle based on a tilting angle of the optical path adjustment unit with respect to an optical axis of the light irradiation unit.

The optical path adjustment unit may be rotatable by being connected to the driving unit via a rotary shaft, and the road surface pattern may be formed on at least one of a lateral side, a front side, or a rear side of the vehicle based on a rotational direction and a rotational angle of the optical path adjustment unit.

A trajectory on the road surface around the vehicle, along which the light is radiated by the optical path adjustment unit, may be adjustable by at least one of a tilting angle of the optical path adjustment unit with respect to the optical axis of the light irradiation unit or a tilting angle of a rotary shaft of the driving unit to which the optical path adjustment unit is rotatably connected. In some implementations, the trajectory on the road surface around the vehicle, along which the light is radiated by the optical path adjustment unit, may be parallel to a front-rear direction of the vehicle. In some other implementations, the trajectory on the road surface around the vehicle, along which the light is radiated by the optical path adjustment unit, may be formed such that a distance to the trajectory from a central line that passes through a center of the vehicle in the front-rear direction changes from a middle lateral side of the vehicle to a front side and a rear side thereof.

The optical path adjustment unit may include at least one reflective surface that reflects the light radiated from the light irradiation unit. A tilting angle of the at least one reflective surface with respect to an optical axis of the light irradiation unit may be adjustable. In some implementations, the at least one reflective surface may include a plurality of reflective surfaces, and tilting angles of the plurality of reflective surfaces with respect to an optical axis of the light irradiation unit may be individually adjustable. Further, the at least one reflective surface may include a plurality of reflective surfaces that reflect the light radiated from the light irradiation unit in different directions, and the plurality of reflective surfaces may allow the road surface pattern to be simultaneously formed at different locations on the road surface around the vehicle.

The light irradiation unit may further include a housing, which includes an open surface to accommodate the optical path adjustment unit and the driving unit therein, and a cover part, which is capable of transmitting the light to allow the light to be radiated to the road surface around the vehicle by the optical path adjustment unit, may be coupled to the open surface of the housing. When mounted on the vehicle, one of the light irradiation unit or the optical path adjustment unit may be disposed closer to a vehicle body than the other thereof.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION

Figure 1:
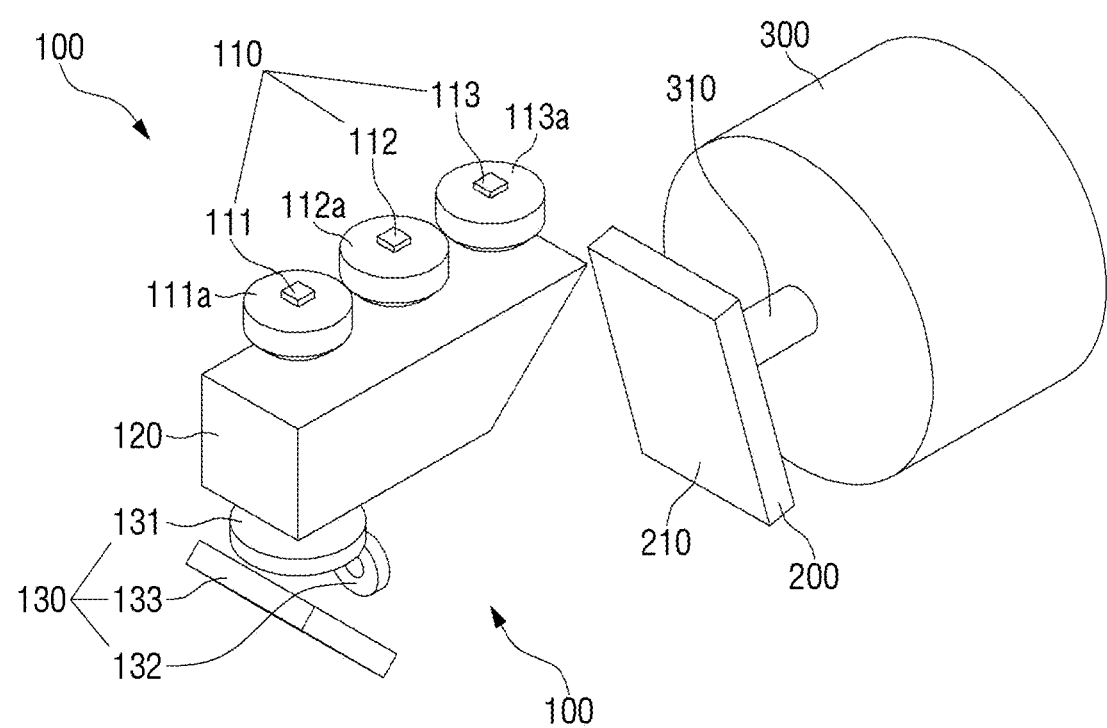
FIG. 1 is a perspective view illustrating a lighting device according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Throughout the specification, like reference numerals in the drawings denote like elements.

In some exemplary embodiments, well-known steps, structures and techniques will not be described in detail to avoid obscuring the invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present disclosure are described herein with reference to plan and cross-section illustrations that are schematic illustrations of idealized exemplary embodiments of the present disclosure. As such, variations from the shapes of the illustrations as a result, for example, of manufacturing techniques and/or tolerances, are to be expected. Thus, exemplary embodiments of the present disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the accompanying drawings for describing a lighting device according to exemplary embodiments of the present disclosure.

Figure 2:
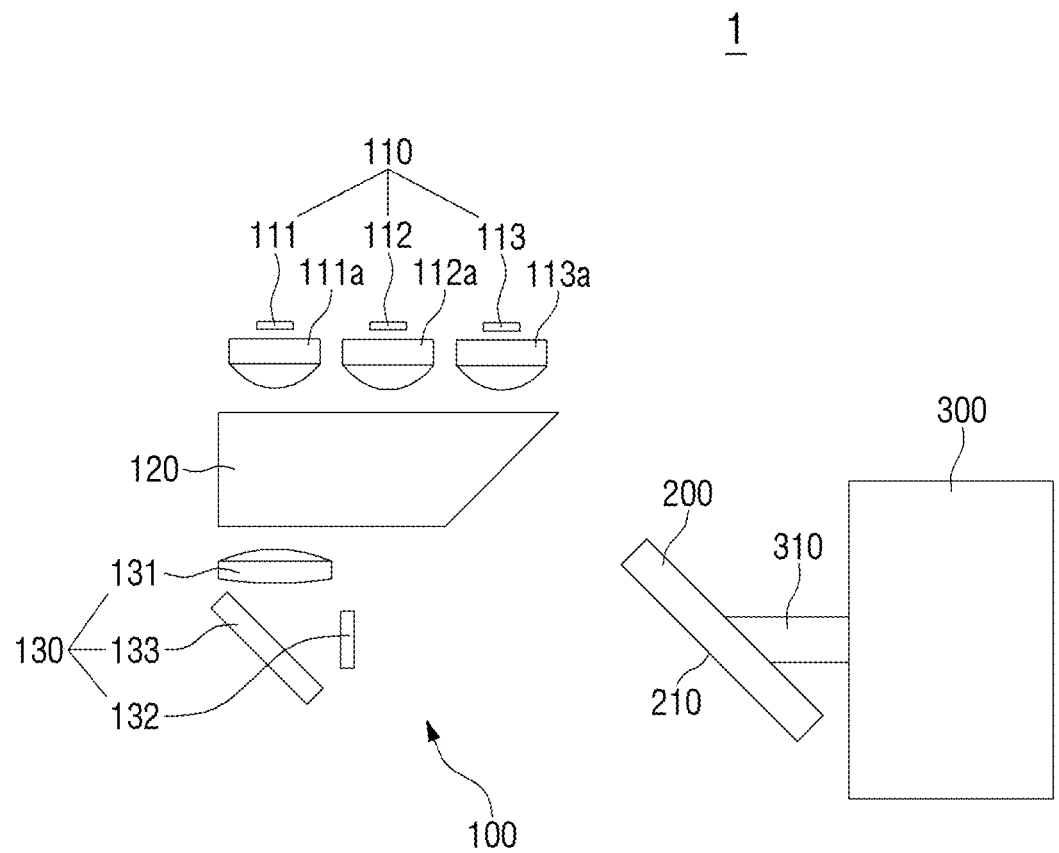
FIG. 2 is a side view illustrating the lighting device according to an exemplary embodiment of the present disclosure.

FIG. 1 is a perspective view illustrating a lighting device according to an exemplary embodiment of the present disclosure, and FIG. 2 is a side view illustrating the lighting device according to the exemplary embodiment of the present disclosure. Referring to FIGS. 1 and 2, a lighting device 1 according to the exemplary embodiment of the present disclosure may include a light irradiation unit 100, an optical path adjustment unit 200, and a driving unit (e.g., an actuator) 300.

In the exemplary embodiment of the present disclosure, the lighting device 1 may be installed in a vehicle and may be used to form a road surface pattern indicating various pieces of information to be transmitted to a driver, a nearby vehicle, a pedestrian, or the like, at a predetermined location on a road surface around the vehicle. However, the present disclosure is not limited thereto, and the lighting device 1 of the present disclosure may be installed not only in a vehicle but also in various devices or places in which light needs to be radiated to a plurality of different locations.

When the lighting device 1 of the present disclosure is installed in a vehicle, various road surface patterns may be formed. In some examples, a road surface pattern indicating rearward movement or a turning direction of the vehicle may be formed. In some other examples, a road surface pattern with a welcoming function may be formed, allowing the vehicle to respond to the driver when the driver approaches the vehicle, as if the vehicle welcomes the driver.

Figure 3:
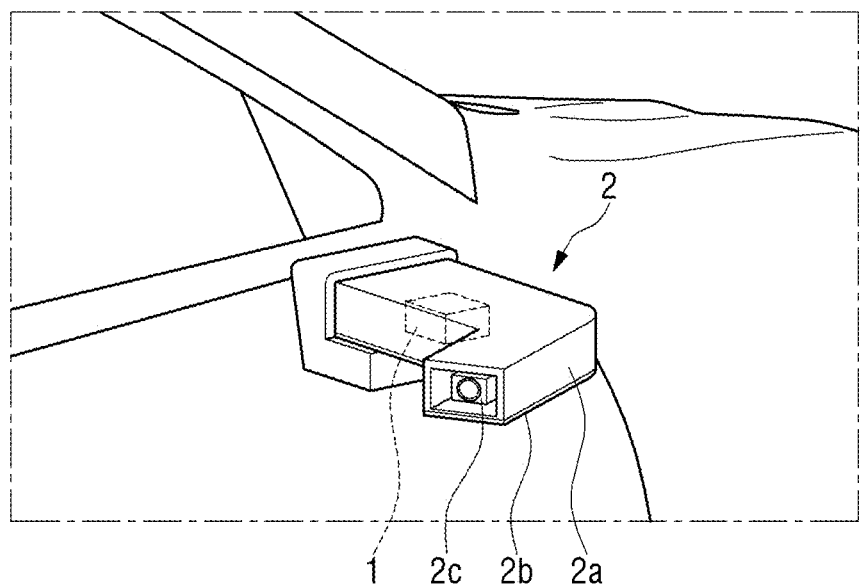
FIG. 3 is a schematic view illustrating an outside mirror in which the lighting device according to an exemplary embodiment of the present disclosure is installed.

Further, in the exemplary embodiment of the present disclosure, as illustrated in FIG. 3, the lighting device 1 may be accommodated in a housing 2a of an outside mirror (e.g., a side mirror) 2 installed on either side of the vehicle, which ensures a visual field for a rear side or a rear lateral side of the vehicle. However, the present disclosure is not limited thereto, and the lighting device 1 of the present disclosure may be installed at various locations such that the road surface pattern may be formed on the road surface around the vehicle.

The housing 2a of the outside mirror 2 may be configured so that one surface is open to accommodate the lighting device 1 of the present disclosure. A cover part 2b, at least a portion of which is open or made of a light-transmitting material may be coupled to the open surface of the housing 2a, so that the light generated from the lighting device 1 of the present disclosure may pass therethrough and be radiated to the road surface around the vehicle.

When the lighting device 1 of the present disclosure is accommodated in the housing 2a, one of the light irradiation unit 100 or the optical path adjustment unit 200 may be disposed closer to a vehicle body than the other, and hereinafter, an example in which the light irradiation unit 100 is disposed more outward with respect to the vehicle as compared to the optical path adjustment unit 200 will be described, but the reverse configuration is also possible.

FIG. 3 shows an example of a camera mirror in which an imaging device 2c is provided in the outside mirror 2 instead of an optical mirror, so that a rear image or a rear lateral image captured by the imaging device 2c is displayed via a display device provided inside the vehicle. However, the present disclosure is not limited thereto, and the present disclosure may be applied similarly when an optical mirror is provided instead of the imaging device 2c. Further, FIG. 3 is an example in which the cover part 2b is coupled to a lower side of the housing 2a so that the light may be radiated to the road surface around the vehicle, but the present disclosure is not limited thereto, and the location of the cover part 2b may be changed based on a direction to which the light is radiated from the lighting device 1 of the present disclosure.

The light irradiation unit 100 may radiate the light having a light quantity and/or a color suitable for the road surface pattern to be formed on the road surface around the vehicle. The light irradiation unit 100 may include a light source unit 110, a light combining unit 120, and a light transmission unit 130.

The light source unit 110 may include a plurality of light sources 111, 112, and 113 that generate the light having different wavelengths, and the number of the light sources included in the light source unit 110 or the wavelengths of the light generated from the light sources may be variously changed depending on the light quantity, the color, or the like, of the light that is required by the lighting device 1 of the present disclosure.

For the plurality of light sources 111, 112, and 113, laser diodes (LDs) may be used. However, the present disclosure is not limited thereto, and various types of light sources such as light emitting diodes (LEDs) or bulbs may also be used as the plurality of light sources 111, 112, and 113.

The light generated from the plurality of light sources 111, 112, and 113 may be converted into parallel light beams by a plurality of optical units 111a, 112a, and 113a. In the exemplary embodiment of the present disclosure, aspherical lenses may be used as the plurality of optical units 111a, 112a, and 113a, but the present disclosure is not limited thereto. In addition to aspherical lenses, collimator lenses such as total internal reflection (TIR) lenses and Fresnel lenses may be used as the plurality of optical units 111a, 112a, and 113a, or reflectors that reflect the light generated from the plurality of light sources 111, 112, and 113 to the light combining unit 120 may also be used as the plurality of optical units 111a, 112a, and 113a.

The light combining unit 120 may combine the light generated from at least one of the plurality of light sources 111, 112, and 113.

Figure 4:
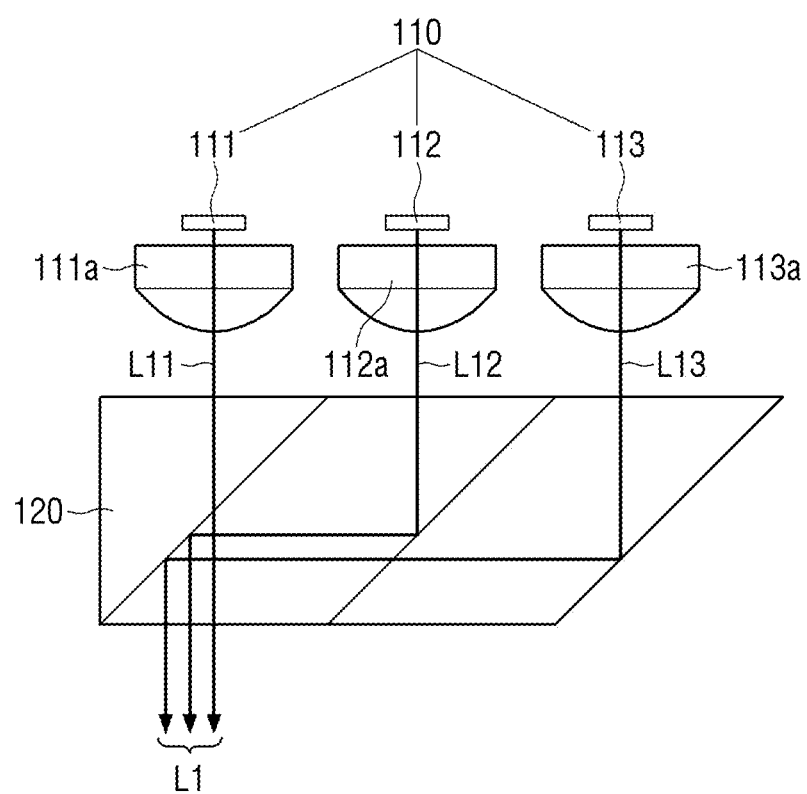
FIG. 4 is a schematic view illustrating an optical path of a light combining unit according to an exemplary embodiment of the present disclosure.

FIG. 4 is a schematic view illustrating an optical path of a light combining unit according to an exemplary embodiment of the present disclosure. Referring to FIG. 4, the light combining unit 120 according to the exemplary embodiment of the present disclosure may generate first light L1 by combining the light beams L11, L12, and L13 generated from the plurality of light sources 111, 112, and 113. FIG. 4 shows an example in which the light beams are generated from all of the plurality of light sources 111, 112, and 113.

In the exemplary embodiment of the present disclosure, a prism may be used as the light combining unit 120. However, the present disclosure is not limited thereto, and various optical elements such as mirrors that selectively transmit certain wavelengths of light and reflect other wavelengths may be used as the light combining unit 120.

The light transmission unit 130 may generate light having a concentration different from that of the light generated by the light combining unit 120 and may transmit the generated light to the optical path adjustment unit 200. In the exemplary embodiment of the present disclosure, light entering the light transmission unit 130 and light being emitted from the light transmission unit 130 may have different directions, and thus the overall size of the lighting device 1 according to the present disclosure may become more compact. A detailed description thereof will be provided below.

Figure 5:
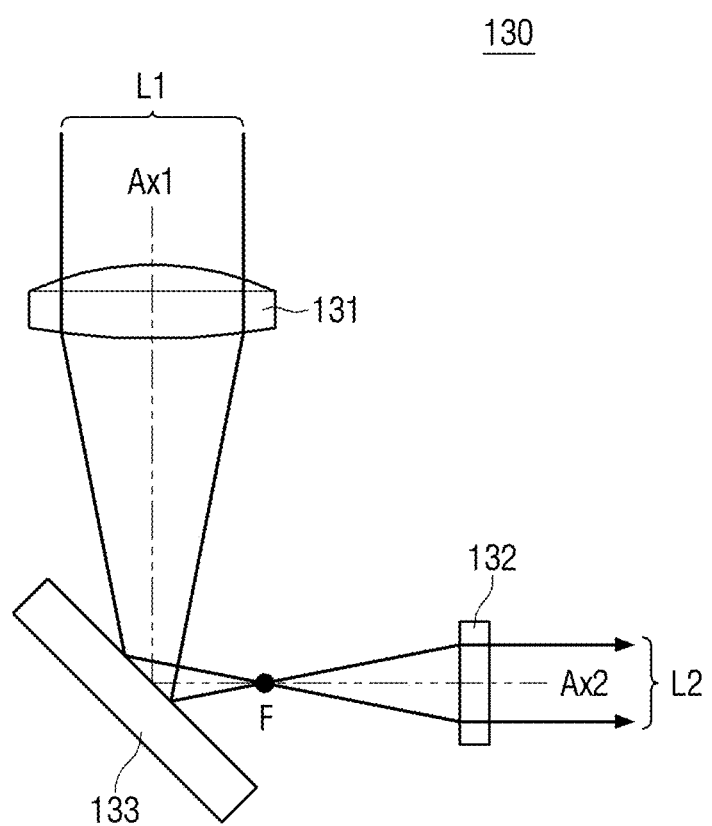
FIG. 5 is a schematic view illustrating a light transmission unit according to an exemplary embodiment of the present disclosure.

FIG. 5 is a schematic view illustrating a light transmission unit according to an exemplary embodiment of the present disclosure. Referring to FIG. 5, in the exemplary embodiment of the present disclosure, the purpose of adjusting the concentration of light by the light transmission unit 130 is to improve definition of the road surface pattern to be formed on the road surface around the vehicle by the lighting device 1 of the present disclosure. In the exemplary embodiment of the present disclosure, the concentration of the light in the light transmission unit 130 may be increased so that sufficient definition may be secured even when a location of the road surface pattern on the road surface around the vehicle changes.

The light transmission unit 130 may include a plurality of lenses 131 and 132 arranged along a traveling path of the light. Hereinafter, in the exemplary embodiment of the present disclosure, the plurality of lenses 131 and 132 may be referred to as a first lens 131 and a second lens 132, respectively. The first lens 131 and the second lens 132 may be formed so that an effective region of the second lens 132 is smaller than an effective region of the first lens 131 to increase the concentration of the first light L1. The effective region of the lens, which is a region that affects a path of incident light among the entire lens, may be defined with a radius with respect to an optical axis of the lens. The effective region of the lens may be the entire lens or may be a partial region thereof.

FIG. 5 shows an example in which the entire regions of the first lens 131 and the second lens 132 are effective regions, and the second lens 132 has a smaller size than the first lens 131 to increase the concentration of light, but the present disclosure is not limited thereto. Even when the first lens 131 and the second lens 132 have the same size, a location of a focus F between the first lens 131 and the second lens 132 may be adjusted by adjusting the curvatures of the first lens 131 and the second lens 132, and thus the effective regions of the first lens 131 and the second lens 132 may be adjusted.

The first lens 131 may be disposed closer to the light combining unit 120 than the second lens 132 along the traveling path of the light, and in the exemplary embodiment of the present disclosure, an example in which an optical axis Ax1 of the first lens 131 and an optical axis Ax2 of the second lens 132 cross each other with a mirror unit 133 disposed therebetween is described.

More particularly, in the exemplary embodiment of the present disclosure, an example in which the optical axis Ax1 of the first lens 131 and the optical axis Ax2 of the second lens 132 are perpendicular to each other is described, but the present disclosure is not limited thereto. The angle between the optical axis Ax1 of the first lens 131 and the optical axis Ax2 of the second lens 132 may be varied based on the traveling path of the light transmitted by the light transmission unit 130.

The mirror unit 133 may reflect the light that passes through the first lens 131 to allow it to travel toward the second lens 132, thereby making the overall size of the light irradiation unit 100 more compact while ensuring a sufficient distance between the first lens 131 and the second lens 132 considering the position of the focus F between the first lens 131 and the second lens 132.

In the above-described exemplary embodiment, an example in which the mirror unit 133 is disposed between the first lens 131 and the second lens 132 along the traveling path of the light and thus the optical axis Ax1 of the first lens 131 and the optical axis Ax2 of the second lens 132 cross each other is described, but the present disclosure is not limited thereto. The first lens 131 and the second lens 132 may be disposed before or after the mirror unit 133 along the traveling path of the light. In such cases, the optical axis Ax1 of the first lens 131 and the optical axis Ax2 of the second lens 132 may coincide.

Figure 6:
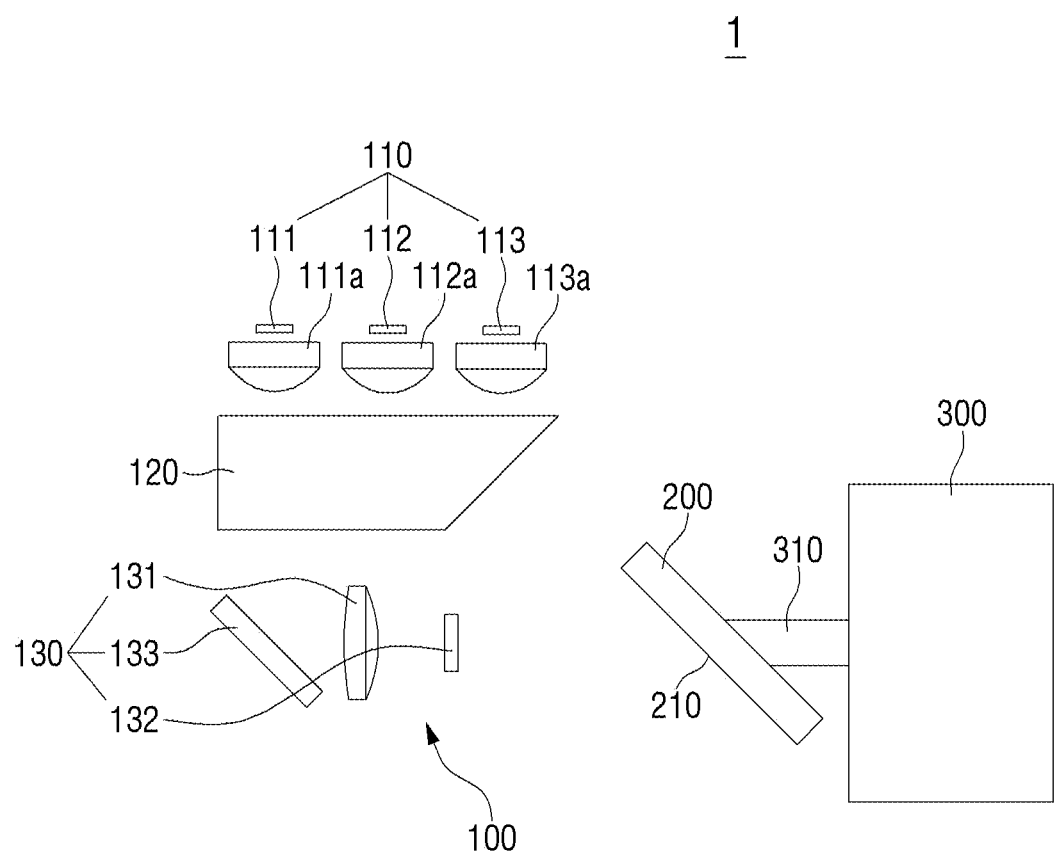
FIG. 6 is a schematic view illustrating a light transmission unit according to another exemplary embodiment of the present disclosure.

An exemplary embodiment of such a configuration of the first lens 131, the second lens 132, and the mirror unit 133 is depicted in FIG. 6. In this exemplary embodiment of the present disclosure, in the light transmission unit 130, since both the first lens 131 and the second lens 132 are disposed after the mirror unit 133 in terms of the traveling path of the light, the optical axis Ax1 of the first lens 131 and the optical axis Ax2 of the second lens 132 may coincide.

In FIG. 6, an example in which both the first lens 131 and the second lens 132 are disposed after the mirror unit 133 in terms of the traveling path of the light is described, but the present disclosure is not limited thereto. Both the first lens 131 and the second lens 132 may be disposed before the mirror unit 133 in terms of the traveling path of the light.

In the exemplary embodiments of the present disclosure as described above, since the directions of the light entering and leaving the light transmission unit 130 are different from each other due to the mirror unit 133, the optical path adjustment unit 200 and the driving unit 300 may be disposed on a lateral side of the light irradiation unit 100 while, in case the light combining unit 120, the first lens 131, and the second lens 132 are linearly arranged without a mirror unit, the optical path adjustment unit 200 and the driving unit 300 need to be also arranged linearly with other components. Therefore, due to the mirror unit 133, a space required by the optical path adjustment unit 200 and the driving unit 300 may be reduced, and thus the lighting device 1 may be more easily installed even where an installation space is limited, like in the outside mirror 2.

In the exemplary embodiment of the present disclosure, an example in which the light transmission unit 130 includes the plurality of lenses 131 and 132 and the mirror unit 133, and second light L2 having a higher concentration than the first light L1 and is transmitted to the optical path adjustment unit 200 is described. However, this configuration is merely an example for helping the understanding of the present disclosure, and the present disclosure is not limited thereto. One or more lenses may be further included in the light transmission unit 130 depending on light distribution characteristics such as the concentration and the brightness of the light transmitted to the optical path adjustment unit 200. In some other exemplary embodiments, a single lens may be included in the light transmission unit 130, and the mirror unit 133 may be omitted.

Meanwhile, in the above-described exemplary embodiment, an example in which the light irradiation unit 100 includes the light source unit 110, the light combining unit 120, and the light transmission unit 130 is described, but the present disclosure is not limited thereto. The light irradiation unit 100 may also include various types of display devices (not illustrated), such as liquid crystal displays (LCDs), organic light emitting diodes (OLEDs), and projectors, which form an image having a predetermined shape and/or size so that the road surface pattern formed by the lighting device 1 of the present disclosure may have more various shapes and/or sizes. Further, when the light irradiation unit 100 includes a display device, the shape and/or size of the road surface pattern formed by the lighting device 1 of the present disclosure may be adjusted based on the shape and/or size of the image formed by the display device.

Referring back to FIG. 1, the optical path adjustment unit 200 according to the exemplary embodiment of the present disclosure may adjust a path of the light to allow the light radiated by the light irradiation unit 100 to travel to a predetermined location of the road surface around the vehicle, and in the exemplary embodiment of the present disclosure, the light radiated by the light irradiation unit 100 may refer to the second light L2 generated by the light transmission unit 130.

Figure 7:
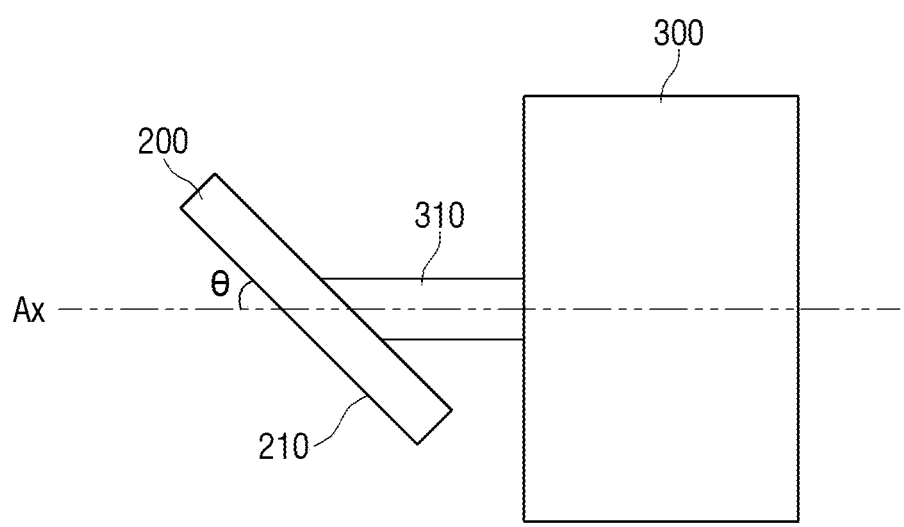
FIG. 7 is a schematic view illustrating a tilting angle of an optical path adjustment unit with respect to an optical axis of a light irradiation unit according to an exemplary embodiment of the present disclosure.
Figure 8:
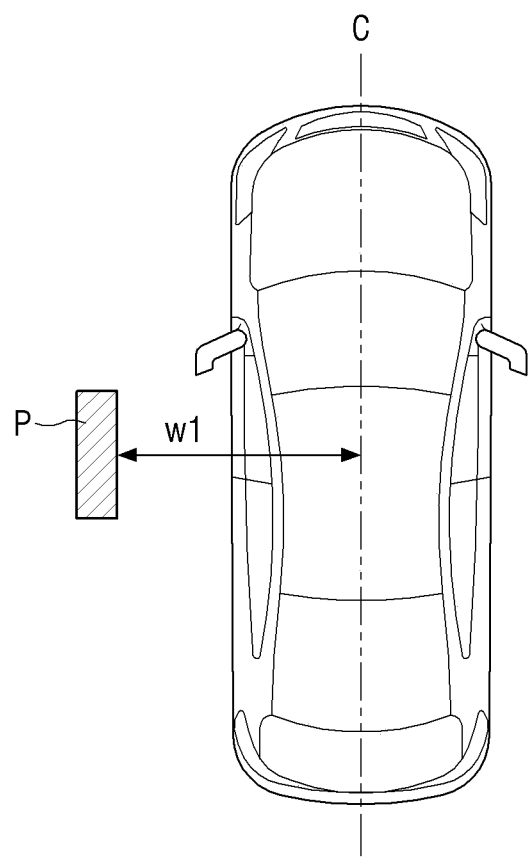
FIGS. 8 and 9 are schematic views illustrating road surface patterns formed by different tilting angles of the optical path adjustment unit according to an exemplary embodiment of the present disclosure.
Figure 9:
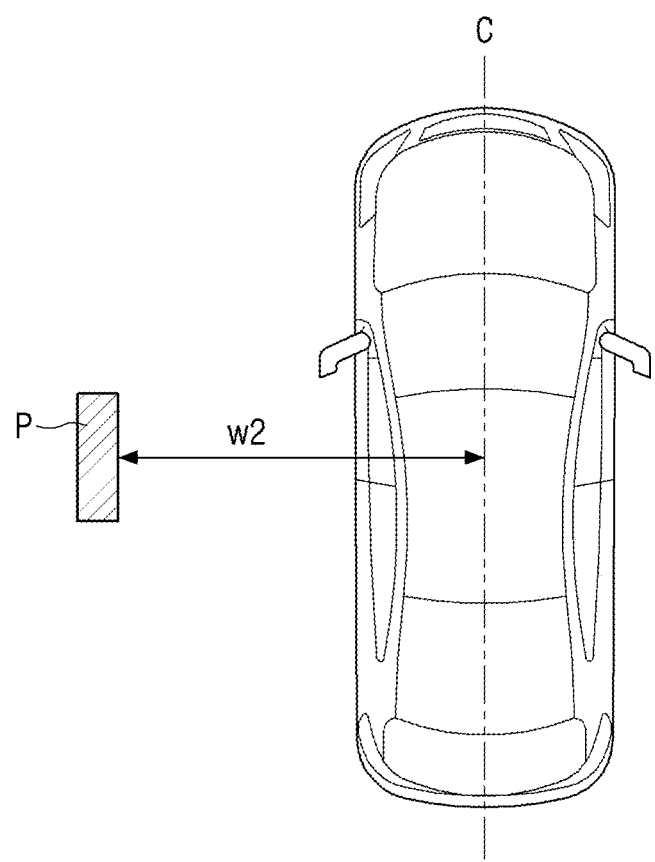

The optical path adjustment unit 200 may include at least one reflective surface 210 that reflects the light radiated by the light irradiation unit 100. A road surface pattern P may be formed at a location spaced apart from a central line C that passes through the center of the vehicle in a front-rear direction, and as illustrated in FIGS. 8 and 9, the road surface pattern P may be formed with different lateral intervals w1 and w2 depending on a tilting angle θ of the optical path adjustment unit 200 with respect to an optical axis Ax of the light irradiation unit 100 as illustrated in FIG. 7. FIGS. 8 and 9 correspond to an example where w2 is greater than w1.

Further, FIGS. 8 and 9 show the road surface pattern P formed on one side of the vehicle, but the present disclosure is not limited thereto. The road surface pattern P may be similarly formed on the other side or on both sides.

In FIG. 7, the optical axis Ax of the light irradiation unit 100 may be understood as the optical axis Ax2 of the second lens 312, which is the last element of the light irradiation unit 100, and the optical axis Ax of the light irradiation unit 100 may be changed depending on the number, locations, or the like of lenses included in the light transmission unit 130.

The reflective surface 210 of the optical path adjustment unit 200 may be inclined to dispose a lower end thereof closer to the vehicle than an upper end thereof so that the light radiated from the light irradiation unit 100 may be radiated to the road surface around the vehicle. Again, this configuration is based on an arrangement where the optical path adjustment unit 200 is disposed closer to the vehicle than the light irradiation unit 100. If the arrangement is flipped, the reflective surface 210 may be inclined to disposed the lower end thereof farther from the vehicle than the upper end thereof.

Herein, the tilting angle θ of the optical path adjustment unit 200 may be understood as an angle between the optical axis Ax of the light irradiation unit 100 and a line that extends from a point at which the optical axis Ax of the light irradiation unit 100 intersects the reflective surface 210 to the upper end of the reflective surface 210.

In the above-described exemplary embodiment, an example in which the optical path adjustment unit 200 includes a single reflective surface 210 is described, but the present disclosure is not limited thereto. The optical path adjustment unit 200 may include a plurality of reflective surfaces, and tilting angles of the plurality of reflective surfaces may be individually adjusted. When the optical path adjustment unit 200 includes a plurality of reflective surfaces, the road surface pattern may be formed at a plurality of different locations, and the locations at which the road surface pattern is formed may be adjusted by the plurality of reflective surfaces.

The tilting angle θ of the optical path adjustment unit 200 may be fixed in advance or may be adjusted as needed. When it is necessary to adjust the tilting angle θ of the optical path adjustment unit 200, the tilting angle θ may be adjusted by an actuator based on an operation by, for example, the driver of the vehicle.

Figure 10:
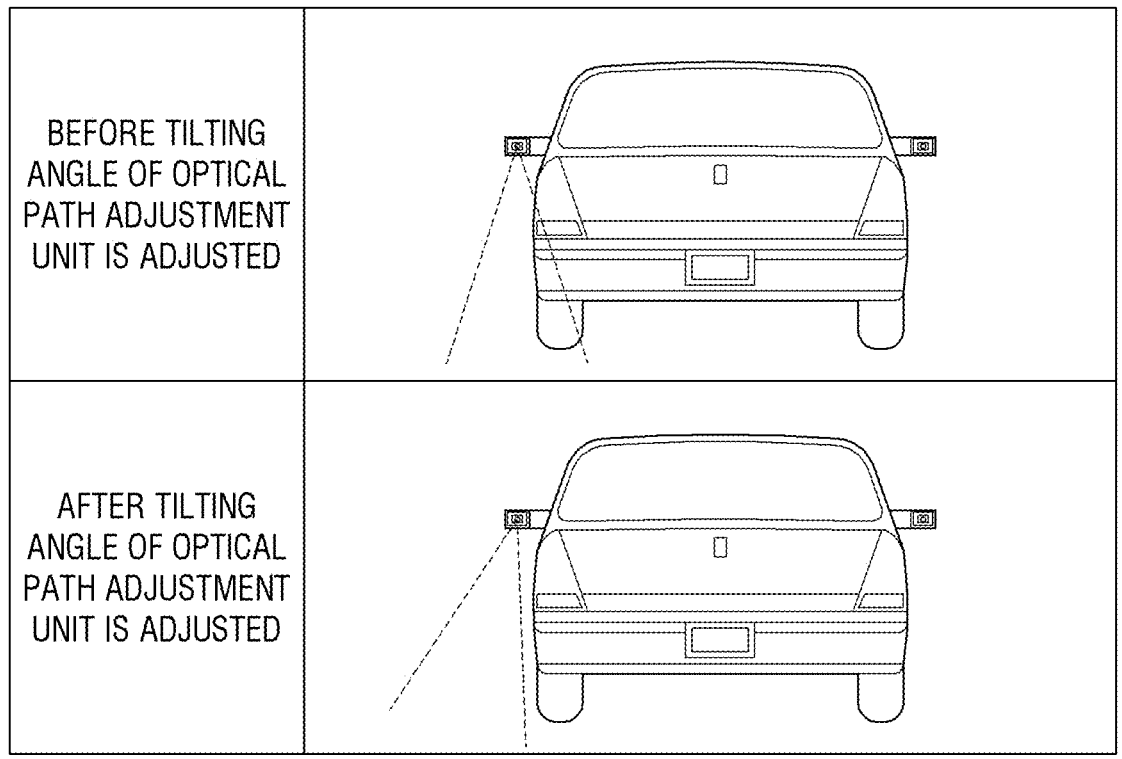
FIG. 10 is a schematic view illustrating a light traveling direction when the tilting angle of the optical path adjustment unit is adjusted according to an exemplary embodiment of the present disclosure.

For example, as illustrated in FIG. 10, when interference between the light radiated from the optical path adjustment unit 200 and the vehicle body occurs as shown in the upper row of FIG. 10, optical loss may occur due to the interference. Thus, by adjusting the tilting angle θ of the optical path adjustment unit 200, the interference between the light radiated from the optical path adjustment unit 200 and the vehicle body may be prevented or reduced as shown in the lower row of FIG. 10.

Figure 11:
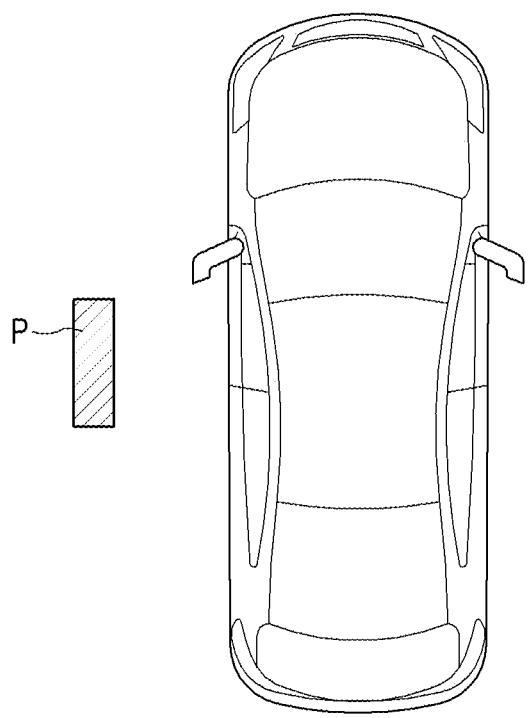
FIGS. 11 to 13 are schematic views illustrating a road surface pattern formed by rotation of the optical path adjustment unit according to an exemplary embodiment of the present disclosure.
Figure 12:
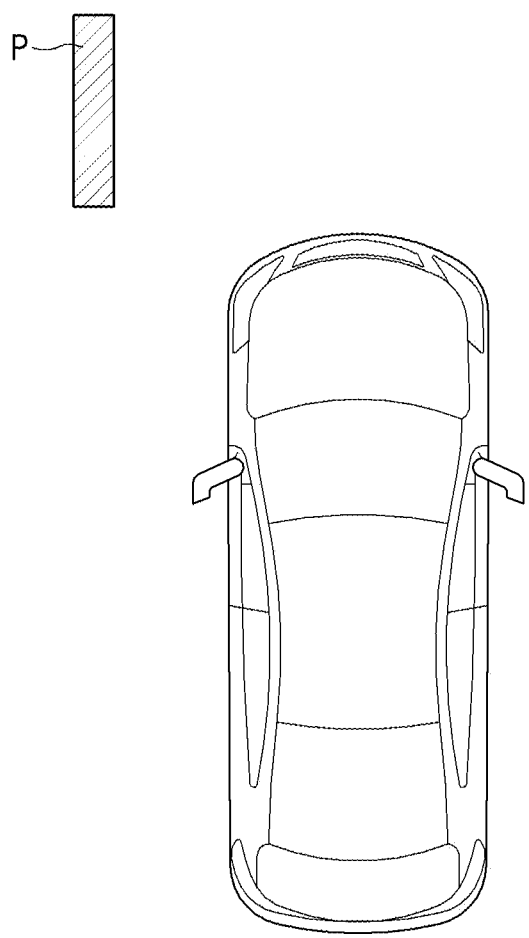
Figure 13:
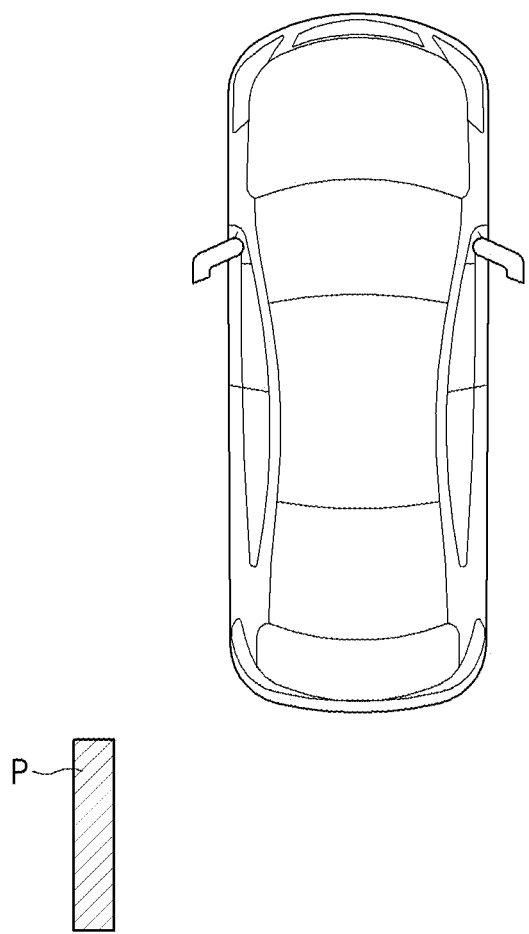

The driving unit 300 may adjust the location of the optical path adjustment unit 200, and in the exemplary embodiment of the present disclosure shown in FIG. 7, the driving unit 300 may rotate the optical path adjustment unit 200 coupled to a rotary shaft 310. The optical path adjustment unit 200 may be rotatable by being connected to the rotary shaft 310 of the driving unit 300, and accordingly, when the driving unit 300 is actuated, the optical path adjustment unit 200 may be rotated about the rotary shaft 310, and when the optical path adjustment unit 200 rotates, the traveling path of the light radiated from the light irradiation unit 100 may be adjusted, and thus the location of the road surface around the vehicle, at which the road surface pattern P is formed, may be varied in the lateral direction and in the front-rear direction as illustrated in FIGS. 11 to 13. As discussed above, the light radiated from the light irradiation unit 100 may be understood as the second light L2 generated by the light transmission unit 130.

Although FIGS. 11 and 13 show an example of the road surface pattern P formed on one side of the vehicle, the road surface pattern may be similarly formed on the other side or both sides of the vehicle.

Further, in the exemplary embodiment of the present disclosure, an example in which the driving unit 300 serves to rotate the optical path adjustment unit 200 about the rotary shaft 310 is described, but the present disclosure is not limited thereto. The driving unit 300 may include two or more actuators such that the driving unit 300 may adjust the tilting angle θ of the optical path adjustment unit 200 as well as the rotation of the optical path adjustment unit 200.

With such a configuration, the location around the vehicle at which the road surface pattern is formed may be varied based on a rotational direction and rotational angle of the optical path adjustment unit 200 in addition to the tilting angle θ of the optical path adjustment unit 200, that is, the tilting angle of the reflective surface 210.

Figure 14:
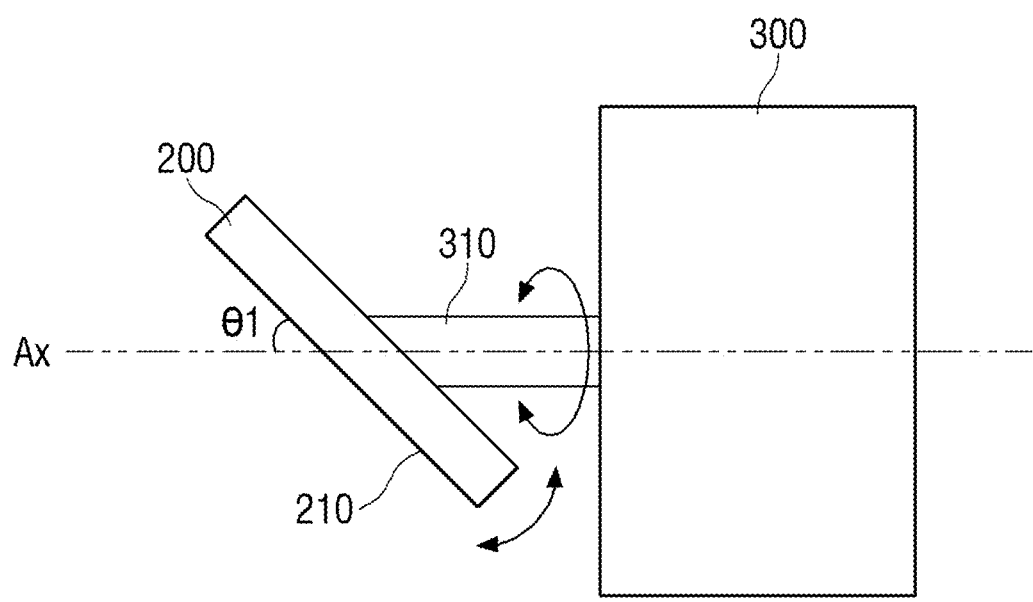
FIG. 14 is a schematic view illustrating the optical path adjustment unit and a driving unit according to an exemplary embodiment of the present disclosure.
Figure 15:
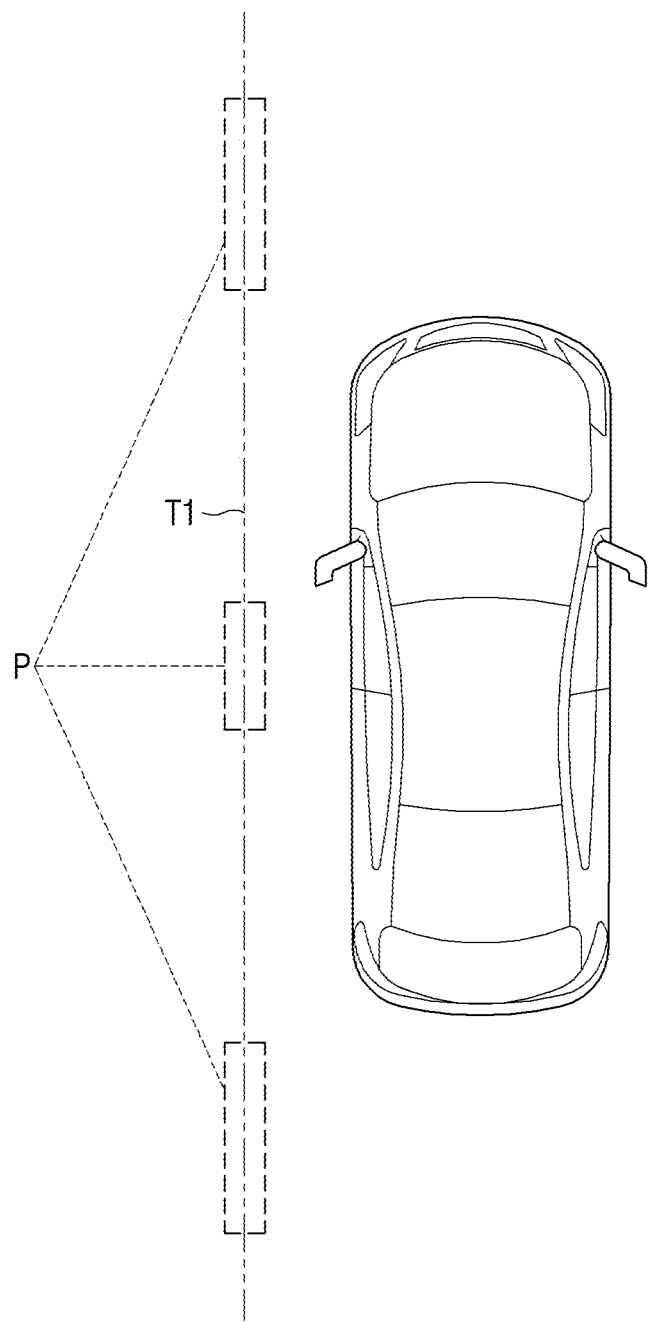
FIG. 15 is a schematic view illustrating a trajectory along which light is radiated by the optical path adjustment unit of FIG. 14.

FIG. 14 is a schematic view illustrating the optical path adjustment unit and a driving unit according to an exemplary embodiment of the present disclosure, and FIG. 15 is a schematic view illustrating a trajectory along which the light is radiated by the optical path adjustment unit of FIG. 14. Referring to FIGS. 14 and 15, when the optical path adjustment unit 200 has a first tilting angle θ1 with respect to the optical axis Ax of the light irradiation unit 100, and when the rotary shaft 310 of the driving unit 300 coincides with the optical axis Ax of the light irradiation unit 100, a trajectory T1, along which the light is radiated when the optical path adjustment unit 200 is rotated by the driving unit 300, may be configured to follow a linear trajectory T1 parallel to the front-rear direction of the vehicle. Consequently, the road surface pattern P may be formed at different locations along the trajectory T1 parallel to the front-rear direction as the optical path adjustment unit 200 is rotated.

FIGS. 14 and 15 correspond to an example in which the first tilting angle θ1 of the optical path adjustment unit 200 with respect to the optical axis Ax of the light irradiation unit 100 is 45 degrees. However, the present disclosure is not limited thereto, and the trajectory along which the light is radiated when the optical path adjustment unit 200 is rotated may be adjusted based on the tilting angle of the optical path adjustment unit 200.

Figure 16:
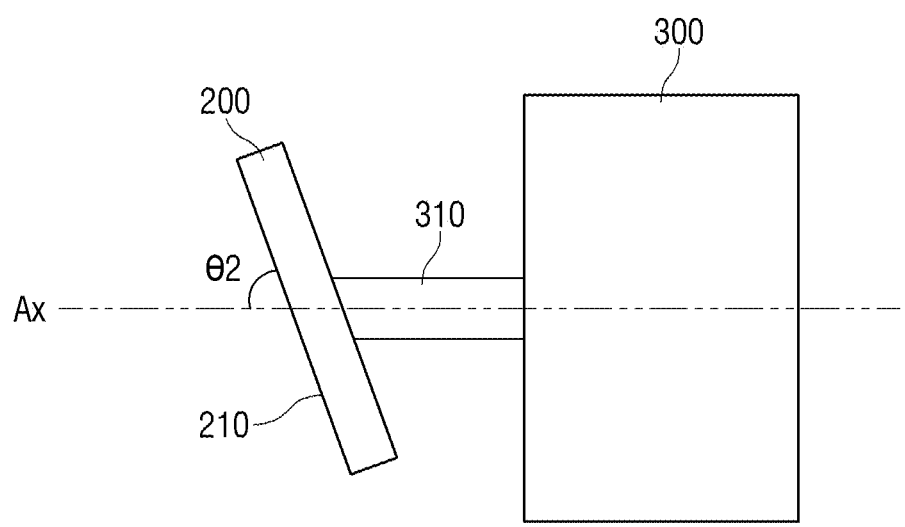
FIG. 16 is a schematic view illustrating an optical path adjustment unit and a driving unit with a different setting according to an exemplary embodiment of the present disclosure.
Figure 17:
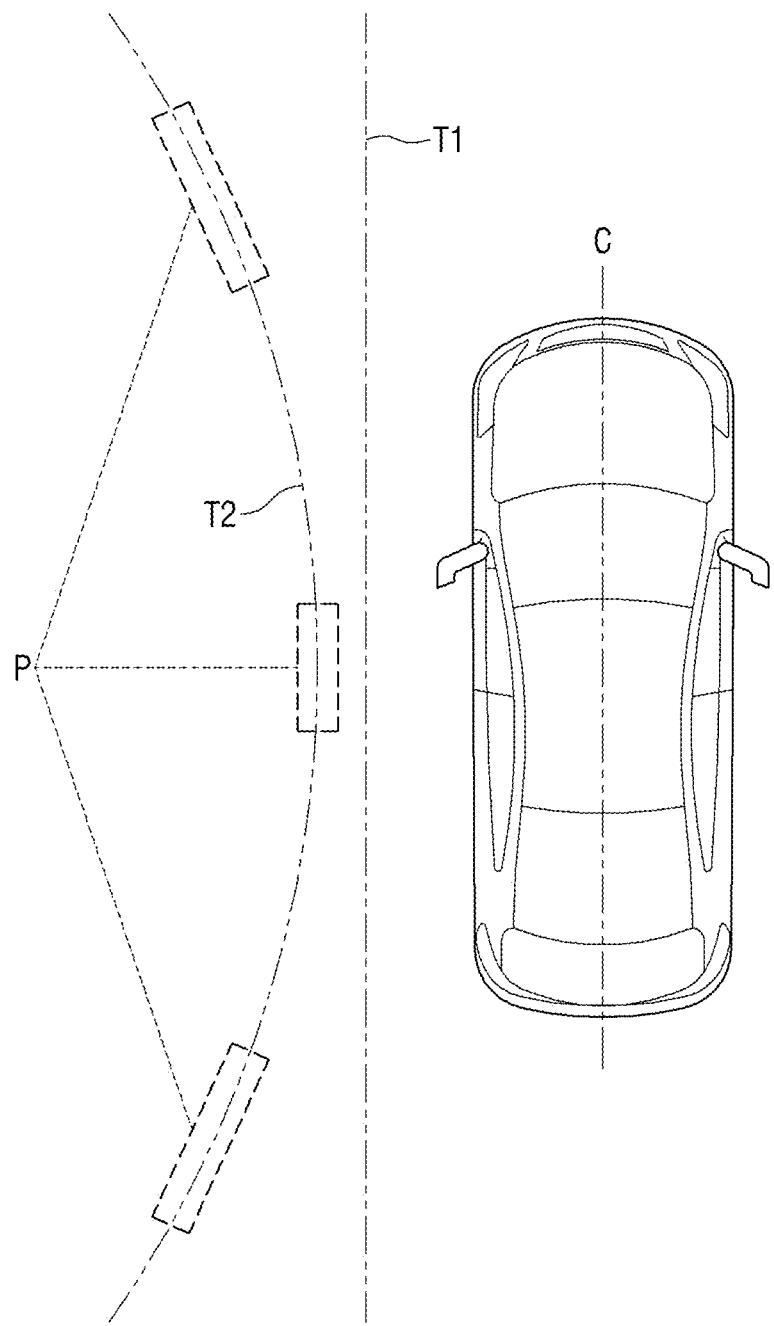
FIG. 17 is a schematic view illustrating a trajectory along which light is radiated under the different setting of the optical path adjustment unit of FIG. 16.

FIG. 16 is a schematic view illustrating an optical path adjustment unit and a driving unit with another tilting angle setting, and FIG. 17 is a schematic view illustrating a trajectory along which light is radiated under the setting of the optical path adjustment unit shown in FIG. 16. Referring to FIGS. 16 and 17, when the optical path adjustment unit 200 has a second tilting angle θ2 greater than the first tilting angle θ1 with respect to the optical axis Ax of the light irradiation unit 100, and when the rotary shaft 310 of the driving unit 300 coincides with the optical axis Ax of the light irradiation unit 100, a trajectory T2, along which the light is radiated as the optical path adjustment unit 200 is rotated by the driving unit 300, may have a curved shape such that a distance from the central line C of the vehicle in the left-right direction increases toward a front side and a rear side of the vehicle from a lateral middle side of the vehicle.

FIGS. 16 and 17 correspond to an example in which the optical path adjustment unit 200 has the second tilting angle θ2 greater than 45 degrees with respect to the optical axis Ax of the light irradiation unit 100. For comparison of the trajectories depending on the tilting angles of the optical path adjustment unit 200, the linear trajectory T1 is also shown in FIG. 17.

The trajectory T2 along which the light is radiated as the optical path adjustment unit 200 rotates has a curved shape so that the light radiated to the road around the vehicle by the optical path adjustment unit 200 exhibits little or no interference with the vehicle body. When the light is radiated to the front side or the rear side of the vehicle by the optical path adjustment unit 200, there is an increased possibility that the light may interfere with the vehicle body due to light diffusion. To avoid such an issue, the road surface pattern formed on the front side or the rear side of the vehicle may be formed at a location having a greater lateral distance from the central line C of the vehicle.

In FIG. 17, an example in which the trajectory T2 formed by the optical path adjustment unit 200 has a curved shape such that a lateral distance from the central line C of the vehicle increases from the middle lateral side of the vehicle to the front side and the rear side thereof is described, but the present disclosure is not limited thereto. When the optical path adjustment unit 200 is disposed to have an angle smaller than the first tilting angle θ1 with respect to the optical axis Ax of the light irradiation unit 100, as opposed to FIG. 17, the trajectory T2 formed by the optical path adjustment unit 200 may have a curved shape such that the lateral distance from the central line C of the vehicle decreases from the middle lateral side of the vehicle to the front side and the rear side thereof.

In other words, based on the tilting angle of the optical path adjustment unit 200, the trajectory along which the light is radiated by the optical path adjustment unit 200 may be parallel to the front-rear direction or may have a shape in which the distance from the central line C of the vehicle in the left-right direction changes from the lateral side of the vehicle to the front side and the rear side thereof.

In the above-described exemplary embodiment, an example in which the trajectory along which the light is radiated by the optical path adjustment unit 200 is adjusted based on the tilting angle of the optical path adjustment unit 200 is described, but the present disclosure is not limited thereto. In some exemplary embodiments, an angle between the rotary shaft 310 of the driving unit 300 and the optical axis Ax of the light irradiation unit 100, that is, the tilting angle of the rotary shaft 310, may be adjusted to adjust the trajectory along which the light is radiated by the optical path adjustment unit 200.

Figure 18:
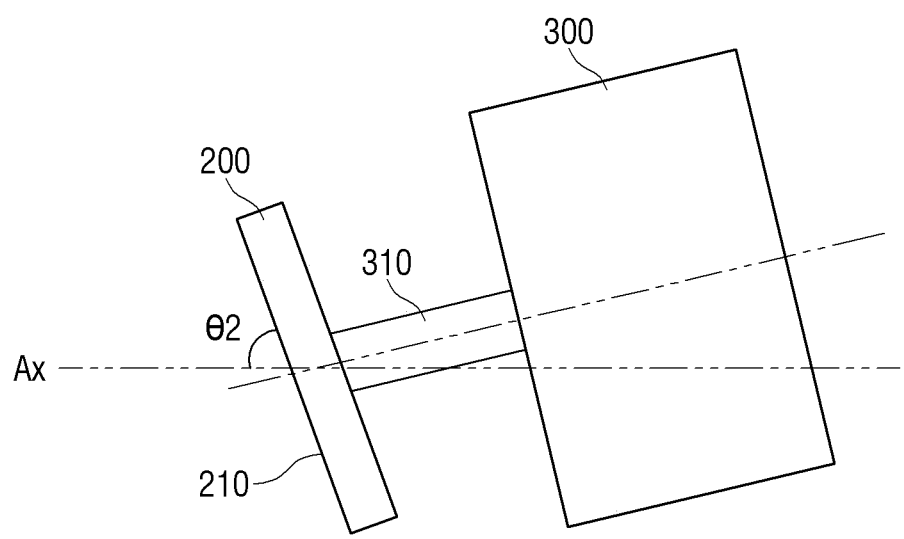
FIG. 18 is a schematic view illustrating an optical path adjustment unit and a driving unit according to another exemplary embodiment of the present disclosure.
Figure 19:
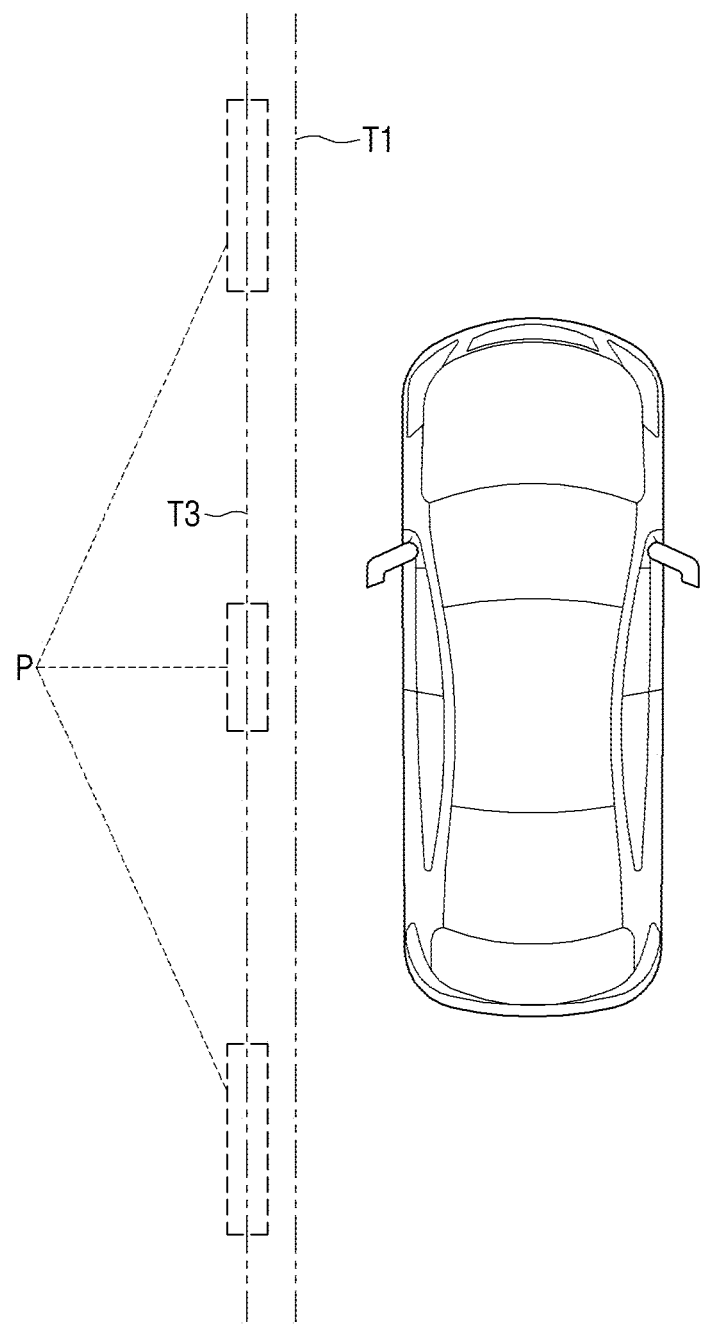
FIG. 19 is a schematic view illustrating a trajectory along which light is radiated by the optical path adjustment unit of FIG. 18.

FIG. 18 is a schematic view illustrating an optical path adjustment unit and a driving unit according to another exemplary embodiment of the present disclosure, and FIG. 19 is a schematic view illustrating a trajectory along which light is radiated by the optical path adjustment unit of FIG. 18. Referring to FIGS. 18 and 19, the optical path adjustment unit 200 may be disposed to have the second tilting angle θ2 with respect to the optical axis Ax of the light irradiation unit 100 as in FIG. 16, and the rotary shaft 310 of the driving unit 300 may be tilted at a predetermined angle with respect to the optical axis Ax of the light irradiation unit 100. In this case, a linear trajectory T3 along which the light is radiated by the optical path adjustment unit 200 may be achieved, which is parallel to the front-rear direction and disposed farther than the trajectory T1 from the vehicle.

Accordingly, even when the tilting angle of the optical path adjustment unit 200 is constant, the shape and/or the location of the trajectory along which the light is radiated by the optical path adjustment unit 200 may be adjusted as the tilting angle of the rotary shaft 310 is adjusted.

In FIG. 18, an example in which the rotary shaft 310 is tilted in the vertical direction with respect to the optical axis Ax of the light irradiation unit 100 is described. However, this is merely an example for helping the understanding of the present disclosure, and the present disclosure is not limited thereto. Depending on the shape of the trajectory along which the light is to be radiated by the optical path adjustment unit 200, the rotary shaft 310 may be tilted in the up-down direction, the front-rear direction, the left-right direction, or any combination thereof, with respect to the optical axis Ax of the light irradiation unit 100. Further, for comparison of the trajectories depending on the tilting angles of the optical path adjustment unit 200 and the rotary shaft 310, the trajectory T1 is also shown in FIG. 19.

As described above, in the lighting device 1 of the present disclosure, a location at which the road surface pattern is formed when the optical path adjustment unit 200 is rotated may be determined based on at least one of the tilting angle of the optical path adjustment unit 200 or the tilting angle of the rotary shaft 310, and the road surface pattern may be formed at a location that ensures sufficient visibility for the driver, the nearby vehicle, the pedestrian, and the like, without interference from the vehicle body.

Meanwhile, when the light irradiation unit 100 includes the display device, the projected image may be corrected using the display device, and the shape of the road surface pattern formed on the road surface around the vehicle may be prevented from being distorted.

Figure 20:
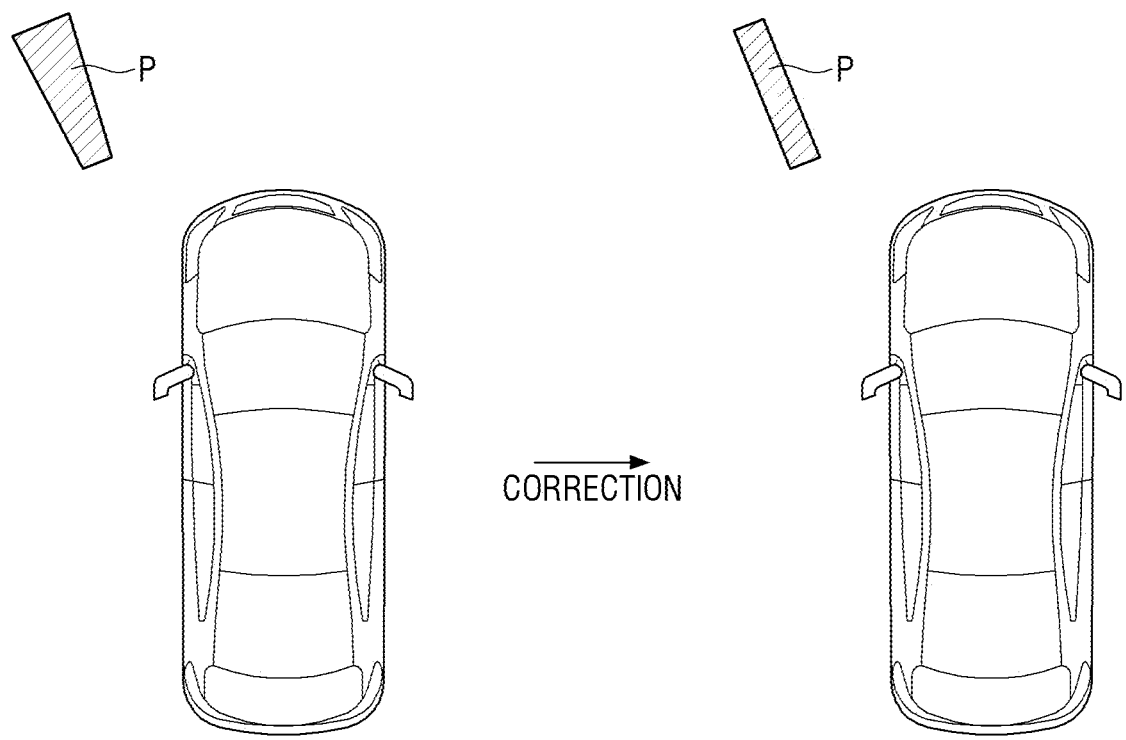
FIG. 20 is a schematic view illustrating a process of correcting a road surface pattern according to an exemplary embodiment of the present disclosure.

In other words, when the image formed by the display device is not corrected, as the light is radiated to a greater distance from the vehicle, the light may be relatively more diffused, and thus the road surface pattern may be distorted. On the other hand, according to the exemplary embodiment of the present disclosure, as the image is formed in consideration of the distance of the road surface pattern to be formed on the road surface from the vehicle, the road surface pattern P may be formed free of distortion as shown in FIG. 20.

Further, when the light irradiation unit 100 includes the display device, the image may be formed in different directions depending on the type or the like of the road surface pattern to be formed on the road surface around the vehicle. For example, when the road surface pattern formed on the road surface around the vehicle includes a text, the road surface pattern that is intended to be provided to the pedestrian may be presented in the front-rear direction to enhance legibility for the pedestrian, and the road surface pattern that is intended to be provided to the nearby vehicle may be presented in the left-right direction to enhance legibility for the driver of the nearby vehicles.

Figure 21:
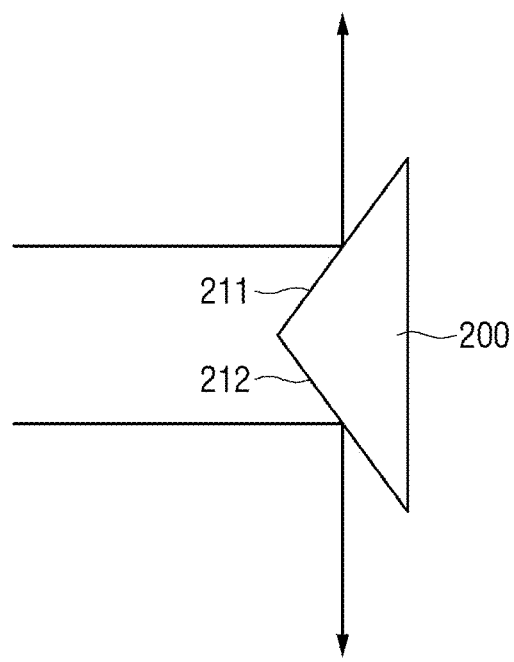
FIG. 21 is a schematic view illustrating a reflective surface of the optical path adjustment unit according to an exemplary embodiment of the present disclosure.
Figure 22:
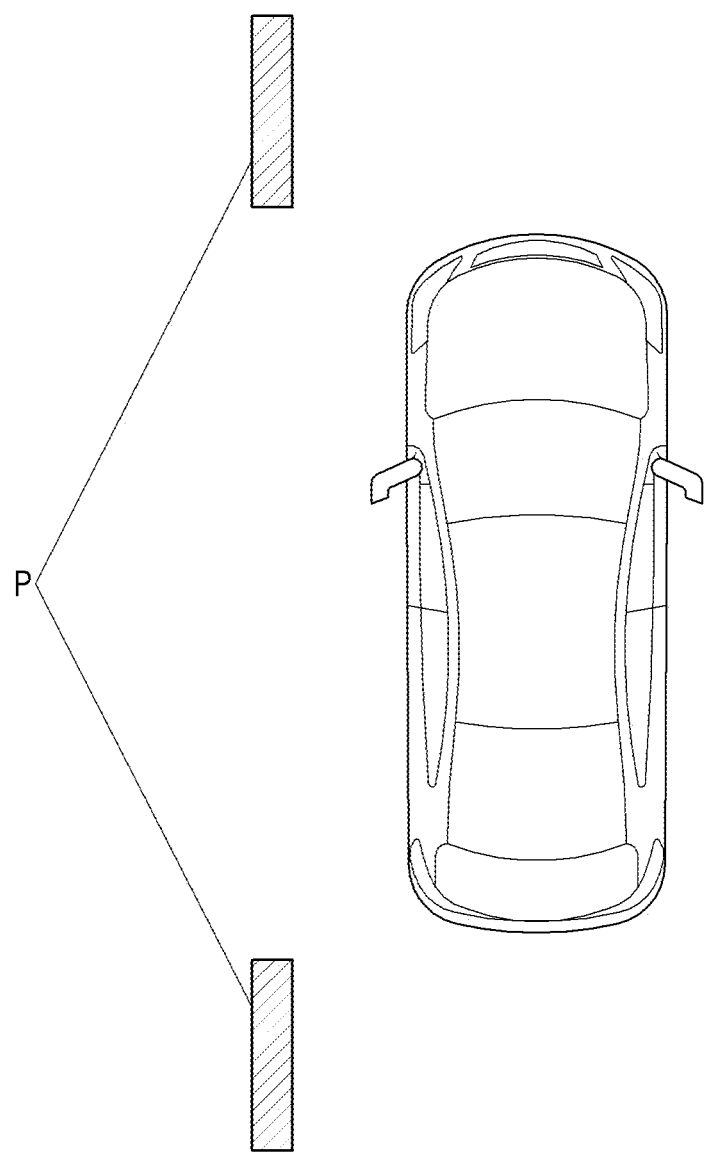
FIG. 22 is a schematic view illustrating a road surface pattern formed by the optical path adjustment unit of FIG. 21.

Further, in the above-described exemplary embodiment, an example in which the optical path adjustment unit 200 includes a single reflective surface 210 is described, but the present disclosure is not limited thereto. As illustrated in FIG. 21, the optical path adjustment unit 200 may include a plurality of reflective surfaces 211 and 212. With such a configuration, a plurality of road surface patterns P may be simultaneously formed on the road surface around the vehicle as illustrated in FIG. 22.

As described above, since the lighting device 1 of the present disclosure may form the road surface pattern at different locations on the road surface around the vehicle without requiring separate lighting devices, a configuration may become more simplified, and a required installation space may be reduced. Further, the location at which the road surface pattern is formed may be more freely adjusted by adjusting at least one of the tilting angle of the optical path adjustment unit 200 or the tilting angle of the rotary shaft 310, and thus when the road surface pattern is formed, interference from the vehicle body may be prevented or reduced.

According to a lighting device of the present disclosure, there are one or more of the following effects. Since a location at which the light radiated from a light irradiation unit is radiated to a road surface around a vehicle can be adjusted by adjusting a tilting angle of an optical path adjustment unit and rotating the optical path adjustment unit, a configuration with which the light is radiated to different locations on the road surface around the vehicle can be shared, and therefore, the configuration can be simplified, and an installation space can be reduced. Further, since a location at which a road surface pattern is formed from the vehicle can be adjusted by adjusting at least one of the tilting angle of the optical path adjustment unit or a tilting angle of a rotary shaft of the optical path adjustment unit, interference from the vehicle body can be prevented when a road surface pattern is formed. The effects of the present disclosure are not limited to the effects described above, and those skilled in the art will clearly understand other effects from the present disclosure.

In concluding the detailed description, those skilled in the art will appreciate that many variations and modifications can be made to the exemplary embodiments without substantially departing from the principles of the present disclosure. Therefore, the disclosed exemplary embodiments are to be used in a generic and descriptive sense only and not for purposes of limitation.

What is claimed is:

1. A lighting device comprising:
a light irradiation unit that generates light;
an optical path adjustment unit that adjusts a path of the light irradiated from the light irradiation unit to allow a road surface pattern to be formed at a predetermined location on a road surface around a vehicle; and
a driving unit that adjusts the optical path adjustment unit to allow the road surface pattern to be formed at different locations on the road surface around the vehicle,
wherein the light irradiation unit includes:
a light source unit that generates the light; and
a light transmission unit that transmits the light generated by the light source unit to the optical path adjustment unit,
wherein the light transmission unit includes:
a first lens and a second lens that adjust concentration of the light generated by the light source unit; and
a mirror unit that reflects the light that passes through one of the first lens or the second lens to the other of the first lens or the second lens, and
wherein optical axes of the first lens and the second lens are oriented at different directions.

2. The lighting device of claim 1, wherein the light source unit includes a plurality of light sources, and
wherein the light irradiation unit further includes a light combining unit that combines the light generated by the plurality of light sources to allow the combined light to travel to the light transmission unit.

3. The lighting device of claim 1, wherein the light transmission unit includes more than two lenses that adjust concentration of the light generated by the light source unit.

4. The lighting device of claim 1, wherein the light that enters the light transmission unit and the light that is output from the light transmission unit have different directions.

5. The lighting device of claim 1, wherein the road surface pattern is formed at locations having different distances from a lateral side of the vehicle based on a tilting angle of the optical path adjustment unit with respect to an optical axis of the light irradiation unit.

6. The lighting device of claim 1, wherein the optical path adjustment unit is rotatable by being connected to the driving unit via a rotary shaft, and
wherein the road surface pattern is formed on at least one of a lateral side, a front side, or a rear side of the vehicle based on a rotational direction and a rotational angle of the optical path adjustment unit.

7. The lighting device of claim 1, wherein a trajectory on the road surface around the vehicle, along which the light is irradiated by the optical path adjustment unit, is adjustable by at least one of a tilting angle of the optical path adjustment unit with respect to an optical axis of the light irradiation unit or a tilting angle of a rotary shaft of the driving unit to which the optical path adjustment unit is rotatably connected.

8. The lighting device of claim 7, wherein the trajectory on the road surface around the vehicle, along which the light is irradiated by the optical path adjustment unit, is parallel to a front-rear direction of the vehicle.

9. The lighting device of claim 7, wherein the trajectory on the road surface around the vehicle, along which the light is irradiated by the optical path adjustment unit, is formed such that a distance to the trajectory from a central line that passes through a center of the vehicle in the front-rear direction changes from a middle lateral side of the vehicle to a front side and a rear side thereof.

10. The lighting device of claim 1, wherein the optical path adjustment unit includes at least one reflective surface that reflects the light irradiated from the light irradiation unit.

11. The lighting device of claim 10, wherein a tilting angle of the at least one reflective surface with respect to an optical axis of the light irradiation unit is adjustable.

12. The lighting device of claim 10, wherein the at least one reflective surface includes a plurality of reflective surfaces, and tilting angles of the plurality of reflective surfaces with respect to an optical axis of the light irradiation unit are individually adjustable.

13. The lighting device of claim 10, wherein the at least one reflective surface includes a plurality of reflective surfaces that reflect the light irradiated from the light irradiation unit in different directions, and
wherein the plurality of reflective surfaces allow the road surface pattern to be simultaneously formed at different locations on the road surface around the vehicle.

14. The lighting device of claim 1, wherein the light irradiation unit further includes a housing, which includes an open surface to accommodate the optical path adjustment unit and the driving unit therein, and
wherein a cover part, which is capable of transmitting the light to allow the light to be irradiated to the road surface around the vehicle by the optical path adjustment unit, is coupled to the open surface of the housing.

15. The lighting device of claim 14, wherein the lighting device is mounted on the vehicle with one of the light irradiation unit or the optical path adjustment unit being disposed closer to a body of the vehicle than the other thereof.

16. A lighting device comprising:
a light source unit that generates light;
a light transmission unit comprising a mirror unit that reflects the light generated by the light source unit;
an optical path adjustment unit that adjusts a path of the light transmitted from the light transmission unit to allow a road surface pattern to be formed at a predetermined location on a road surface around a vehicle; and
a driving unit that adjusts the optical path adjustment unit to allow the road surface pattern to be formed at different locations on the road surface around the vehicle,
wherein the optical path adjustment unit includes a plurality of reflective surfaces that reflect the light transmitted from the light transmission unit, and
wherein tilting angles of the plurality of reflective surfaces are individually adjustable.

17. A lighting device comprising:
a light irradiation unit that generates light;
an optical path adjustment unit that adjusts a path of the light irradiated from the light irradiation unit to allow a road surface pattern to be formed at a predetermined location on a road surface around a vehicle; and
a driving unit that adjusts the optical path adjustment unit to allow the road surface pattern to be formed at different locations on the road surface around the vehicle,
wherein the optical path adjustment unit includes a plurality of reflective surfaces that reflect the light irradiated from the light irradiation unit in different directions, and
wherein each of the plurality of reflective surfaces allows at least a portion of the road surface pattern to be formed on the road surface around the vehicle.

* * * * *